United States Patent
Bommer et al.

(10) Patent No.: US 7,975,536 B2
(45) Date of Patent: Jul. 12, 2011

(54) METHOD TO DETECT THE PRESENCE OF A LIQUID-COOLED ENGINE SUPPLEMENTAL HEATER

(75) Inventors: Eric Bommer, Davison, MI (US); Kenneth M. Simpson, Swartz Creek, MI (US); Michael E. List, Grand Blanc, MI (US); Warren Huang, Toronto (CA)

(73) Assignee: Delphi Technologies, Inc., Troy, MI (US)

( * ) Notice: Subject to any disclaimer, the term of this patent is extended or adjusted under 35 U.S.C. 154(b) by 341 days.

(21) Appl. No.: 12/145,112

(22) Filed: Jun. 24, 2008

(65) Prior Publication Data
US 2009/0319162 A1 Dec. 24, 2009

(51) Int. Cl.
*G01M 15/04* (2006.01)
(52) U.S. Cl. ................... 73/114.68; 73/114.77
(58) Field of Classification Search ............. 73/114.58, 73/114.59, 114.61, 114.68, 114.77
See application file for complete search history.

(56) References Cited

U.S. PATENT DOCUMENTS

| | | | | |
|---|---|---|---|---|
| 5,781,877 A | * | 7/1998 | Rachel et al. | 701/104 |
| 6,714,854 B2 | * | 3/2004 | Linenberg et al. | 701/113 |
| 6,931,865 B1 | * | 8/2005 | Van Gilder et al. | 62/129 |
| 7,757,649 B2 | * | 7/2010 | Wakahara | 123/142.5 E |
| 2008/0300774 A1 | * | 12/2008 | Wakahara | 701/113 |

* cited by examiner

*Primary Examiner* — Eric S McCall
(74) *Attorney, Agent, or Firm* — Thomas N. Twomey (57) ABSTRACT

A method for detecting an engine block heater includes block heater detection logic and a data table containing calibration thresholds. The method determines a time-series of delta (Δ) engine coolant temperatures (ECT), which represent the respective differences between a start-up ECT and a plurality of operating ECT values measured thereafter. The method integrates the time-series to obtain a Δ ECT integral. The method also maintains an integrated engine speed parameter accumulated over the course of the detection period. Throughout the detection period, the method retrieves a threshold value from the table based on the integrated engine speed (Y-axis) versus an elapsed time (X-axis) since the detection period began. When the calculated Δ ECT integral value exceeds the retrieved threshold, the method determines that the block heater was operated, which can thereafter be used to suppress sensor rationality testing or reporting of results thereof.

6 Claims, 4 Drawing Sheets

METHOD TO DETECT THE PRESENCE OF A LIQUID-COOLED ENGINE SUPPLEMENTAL HEATER

TECHNICAL FIELD

The invention relates generally to vehicle diagnostics and more particularly to a method of detecting the presence (i.e., operation) of a liquid-cooled engine supplemental heater.

BACKGROUND OF THE INVENTION

Increasing awareness of the effects of vehicle exhaust emissions and the like has resulted in regulations to control these emissions. In particular, various federal and state on-board diagnostic regulations (e.g., OBDII) require that certain emission related systems on the vehicle be monitored, and that a vehicle operator be notified if the system is not functioning in a predetermined manner. Automotive vehicle electronics therefore include a programmed diagnostic data manager or the like service configured to receive reports from diagnostic algorithms/circuits concerning the operational status of various components or systems and to set/reset various standardized diagnostic trouble codes (DTC) and/or otherwise generate an alert (e.g., MIL). The intent of such diagnostics is to inform the operator when performance of a component and/or system has degraded to a level where emissions performance may be affected and to provide information (e.g., via the DTC) to facilitate remediation.

In this regard, the California Air Resources Board (CARB) requires monitoring for "irrational" sensor values. A sensor value may be considered irrational when it is outside of a range of allowed normal performance. Rationality diagnostics rely on other system performance signals to evaluate the accuracy of the sensor signal undergoing the rationality test.

Two examples of rationality tests include an intake air temperature (IAT) skewed low test and an engine coolant temperature (ECT) range low-limited test. As to the IAT test, one characteristic evaluated is whether the measured IAT is skewed relative to what it should or is expected to be (i.e., skewed high or skewed low), for example, as seen by reference to U.S. Pat. No. 7,120,535 entitled "METHOD AND APPARATUS TO EVALUATE AN INTAKE AIR TEMPERATURE MONITORING CIRCUIT" issued to Rahman et al, owned by the common assignee of the invention and hereby incorporated by reference in its entirety.

Rahman et al. disclose a method for performing an IAT (skew low) rationality test that involves comparing the IAT measurement with an engine coolant temperature (ECT) measurement under circumstances where they are expected to be about the same. For example, start-up IAT and ECT measurements should generally be the same after a long (e.g., greater than 6 hours) "soak" in cold environments (i.e., when a vehicle is exposed to ambient air temperatures, with its ignition turned off and thus has been allowed to cool off). If there is a large temperature offset (e.g., >20° C.) between the start-up IAT and ECT after adequate soak time, the IAT rationality test assumes that the IAT sensor output signal is skewed, and then conducts a secondary drift check. The purpose of the secondary check is to determine if the large temperature offset is caused by a skewed sensor (which should fail the test) or rather by non-stabilized ambient conditions (which should not fail the test). Rahman et al. further disclose that the secondary check involves subsequent monitoring of the IAT sensor output for a predetermined amount of time, constantly comparing new IAT readings with the start-up IAT. If the subsequent IAT reading(s) do not show sufficient change within the predetermined time, the IAT rationality test will conclude that the IAT sensor/output is skewed and a failure will be reported. However, if there is sufficient change in the IAT, no report is made, on the belief that unstable ambient conditions caused the initial skew between the start-up IAT and start-up ECT. When certain conditions are met (e.g., a recurrence of the detected IAT skew), a failure code or other indication may be generated (i.e., a DTC "P0111-IAT Circuit Range/Performance Problem" flag may be set).

A problem, however, exists in the art. As background, it is known to provide an engine block heater on certain vehicles, which is a desirable feature especially in colder climates. In cold operating temperatures, the engine can suffer slow engine cranking speed and unstable combustion. The slow cranking speed is caused primarily by the inherent higher viscosity of the engine lubricating oil, reduced frictional bearing clearances as well as reduced battery performance. The engine block heater is typically deployed as a heating element or the like located in the engine block. The engine block heater is operated, typically from an external alternating current (AC) power source, for heating the engine block and thus also heating up the engine coolant contained in the block. Increasing the engine coolant temperature reduces the impact of viscosity and bearing clearances (although battery performance is not directly affected). Accordingly, the use of the block heater facilitates cold starting, among other benefits.

Operation of the engine block heater, however, can confuse the IAT and ECT rationality diagnostics. Testing has shown that the engine block heater can (1) raise the engine coolant temperature (ECT) as much as 50° C. above ambient and (2) raise the intake air temperature (IAT) as much as 20° C. above ambient. This results in a temperature offset at start-up between IAT and ECT by as much as 35° C. after an ample soak time. Thus, a conventional IAT rationality test, in view of this temperature difference, would conclude that there is a rationality problem with the IAT sensor output, since it is skewed to the low side of the ECT. This conclusion, however, is erroneous. Moreover, since the engine block heater is operated from externally-provided AC power, it is not possible for an engine control unit (ECU) or the like to directly detect if an engine block heater was operated during soak. It is important for the reliability of certain rationality tests (including the IAT and ECT tests mentioned) to be able to determine if an engine block heater has been used during soak.

There is therefore a need for a system and method for detecting the presence (operation) of an engine block heater that minimizes or eliminates one or more of the problems set forth above.

SUMMARY OF THE INVENTION

The invention provides a reliable mechanism for detecting the operation of an engine block heater, which can be subsequently used to improve the robustness of the certain vehicle diagnostics, such as IAT and ECT sensor rationality tests. It has been observed that after a minimum soak time, the engine coolant temperature for a typical liquid-cooled engine will exhibit a droop in the moments immediately following engine start-up. This is because the coolant contained outside the engine block, which is cold, begins to circulate into the warm engine block, thereby reducing the overall coolant temperature. However, as the engine continues to run (and the coolant circulated), the ECT experiences a temperature recovery.

A method according to the invention is configured to detect this characteristic temperature profile and in so doing, determine that a block heater is or has been operated during the previous soak period. The invention uses an integrated delta (Δ) engine coolant temperature (ECT), which is computed as follows. Upon engine start-up, the ECT is measured as the start-up ECT (SUECT). At a plurality of points in time after engine start-up, a respective operating ECT is measured. The difference between the SUECT, on the one hand, and each of the subsequently measured operating ECTs on the other, produces a time-series of Δ ECTs. The time-series of Δ ECTs is integrated to form the integrated Δ ECT. The method also involves, after engine start-up, integrating the engine speed over time to form an integrated engine speed, which is indicative of the accumulated total of engine revolutions. A predetermined data table includes calibration thresholds, which are accessed by X and Y indexing. The X-index is the total elapsed time that the engine has been running (after start-up) and the Y-index is the integrated engine speed (e.g., RPM) from start-up. The method further involves the step of comparing the integrated Δ ECT with a threshold selected based on the integrated engine speed versus time until either a heater detected condition is met (i.e., when the integrated Δ ECT exceeds the threshold) or alternatively a "heater not detected" condition is satisfied.

A method of using block heater detection for suppressing sensor rationality diagnostics is also presented. Further, a corresponding system is also presented.

BRIEF DESCRIPTION OF THE DRAWINGS

The present invention will now be described by way of example, with reference to the accompanying drawings.

DETAILED DESCRIPTION OF THE PREFERRED EMBODIMENT

Figure 1:
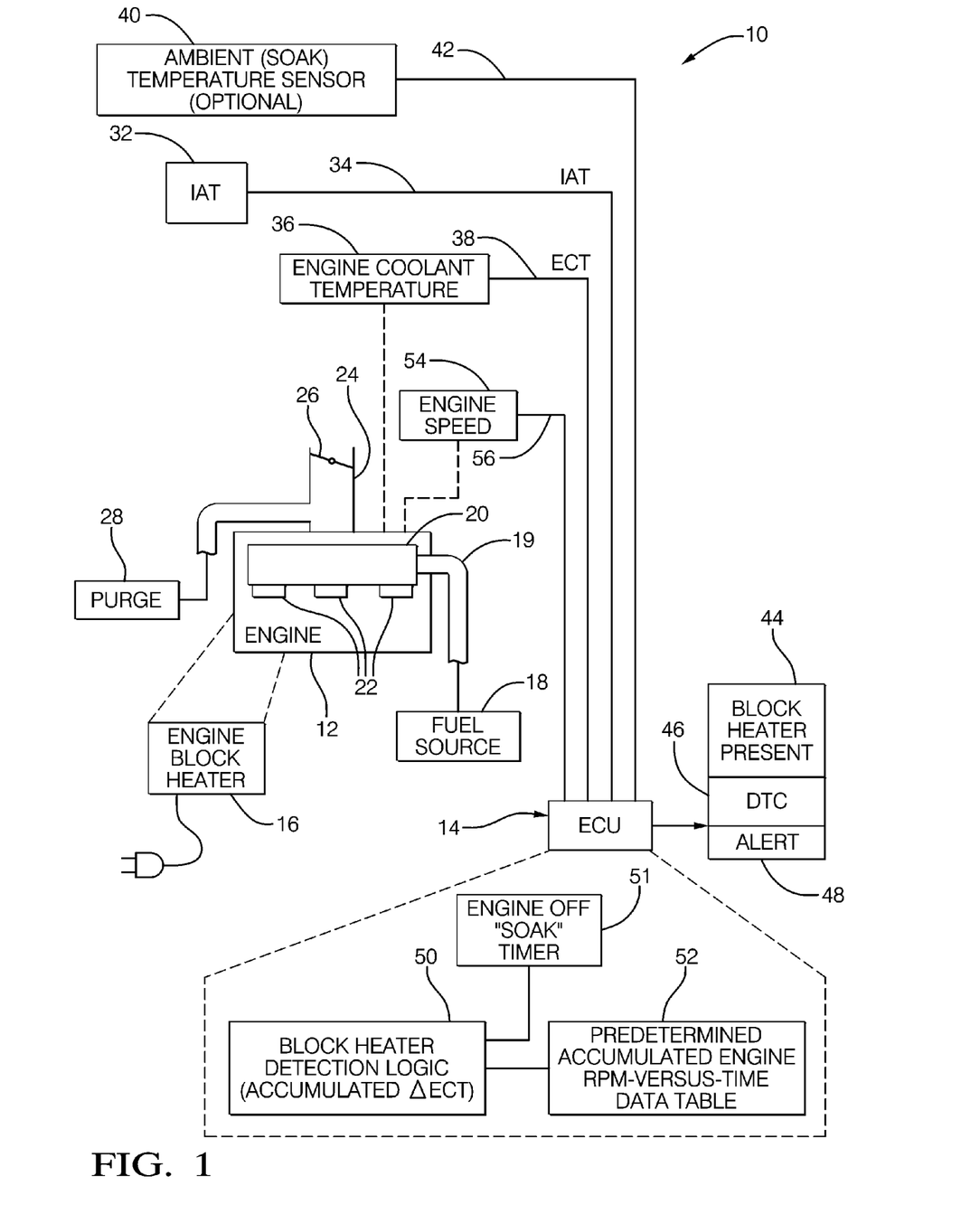
FIG. 1 is a block diagram of an exemplary automotive vehicle environment, including a liquid-cooled engine having an engine block supplemental heater, in which embodiments of the invention may be used.

Referring now to the drawings wherein like reference numerals are used to identify identical components in the various views, in FIG. 1, the reference numeral 10 generally designates a portion of an exemplary automotive vehicle system 10 in which the inventive block heater detection method may be used. The system 10 includes a liquid-cooled internal combustion engine 12 controlled generally by an electronic engine controller/control unit (ECU) 14 or the like.

Before proceeding to a detailed description, it should be noted that the invention provides a mechanism to detect whether or not an engine block heater is or has been operated during a previous soak period. This knowledge may be usefully applied to subsequently perform any one or more of a plurality of diagnostic tests, such as an IAT rationality (skew low) test, an ECT rationality (range low-limited) test or other diagnostics now known or hereafter developed that can use the knowledge of whether or not the block heater was operated during soak. It should be understood that the detection functionality of the invention is not limited to these two rationality tests.

For clarity, the IAT skewed low diagnostic compares the intake air temperature to the engine coolant temperature at key-on (start-up). If the engine coolant temperature (ECT) differs from that of the intake air temperature (IAT) by more than a calibratable error threshold, the IAT sensor output is considered skewed and a failure is reported. A block heater (e.g., block heater 16) keeps the engine coolant, at least the engine coolant in or near the engine block, at a temperature above that of the ambient air and thus confuses the diagnostic. When the resulting IAT-ECT error is beyond that of the calibrated error threshold, this leads to a false failure being reported to the diagnostic data manager.

Likewise, the ECT range low limited diagnostic monitors the engine coolant temperature (ECT) for a delta temperature rise over time early in the driving cycle. Failure to achieve the expected rise fails the range low-limited ECT diagnostic. The block heater (e.g., block heater 16) skews the coolant temperature high and prevents at least some of the temperature rise from occurring, possibly causing a false failure to be reported.

With continued reference to FIG. 1, and as to the general structure, the ECU 14 includes at least one microprocessor or other processing unit, associated memory devices such as read only memory (ROM) and random access memory (RAM), a timing clock, input devices for monitoring input from external analog and digital devices and controlling output devices. In general, the ECU 14 is operable to monitor engine operating conditions and other inputs (e.g., operator inputs) using the plurality of sensors and input mechanisms, and control engine operations with the plurality of output systems and actuators, using pre-established algorithms and calibrations that integrate information from monitored conditions and inputs. The software algorithms and calibrations which are executed in the ECU 14 may generally comprise conventional strategies known to those of ordinary skill in the art. Overall, in response to the various inputs, the ECU 14 develops the necessary outputs to control the throttle valve position, fuel, spark, and other aspects, all as known in the art.

The liquid-cooled engine 12 includes an engine block heater 16, which as shown, is configured to be operated by way of connection to an external alternating current (AC) power source or the like by a conventional plug. The engine block heater 16 comprises a heating element(s) disposed in specially-formed bores in the engine block (not shown). The engine block heater 16 is configured to heat the engine block, and thus also the engine coolant of the engine 12, which is especially desirable in colder climates. The engine block heater 16 is configured to deliver heat at a known rate to the engine block. It should be appreciated that operation of the engine block heater 16, for example by plugging it into an AC outlet, is not an action under the control of the ECU 14 and thus there is no direct way for the ECU 14 to know that the engine block heater is or has been operated.

The engine 12 as known consumes fuel from a fuel source 18 provided via line 19 to an engine fuel rail 20. The fuel may be delivered via a conventional arrangement of a plurality of fuel injectors 22. FIG. 1 further shows an air intake manifold 24 on the vacuum or downstream side of a throttle valve 26 for delivering air to be mixed with fuel, as known. A conventional evaporative emissions control system, shown generally as block 28, may also be included.

FIG. 1 also shows a variety of sensors deployed with respect to the engine 12, including an intake air temperature (IAT) sensor 32 configured to generate an IAT signal 34, an engine coolant temperature (ECT) sensor 36 configured to generate an ECT signal 38, an engine speed sensor 54 configured to generate an engine speed signal 56 and an optional ambient (soak) temperature sensor 40 configured to generate an ambient temperature signal 42. The IAT signal 34 is indicative of the measured temperature of the intake air. The ECT signal 38 is indicative of the engine coolant temperature. The engine speed signal 56 is indicative of the rotational speed of the engine (e.g., this sensor may be a crankshaft position sensor or the like from which engine speed may be derived, as known). The ambient temperature signal 42 is indicative of the temperature of the environment external to the vehicle. These sensors and their functioning are all well known and understood in the art. For purposes of the invention, these sensors may all comprise conventional components. It should be understood that numerous other sensors typically found in a vehicle/engine system have been omitted for clarity.

In addition to the control of engine 12, the ECU 14 is configured to perform various diagnostics, including an IAT rationality test, an ECT rationality test and others as well. The ECU 14 may be configured to include a diagnostic data manager or the like, a higher level service arranged to manage the reports received from various lower level diagnostic routines/circuits, such as the rationality diagnostics described herein, and set or reset diagnostic trouble code(s)/service codes, as well as activate or extinguish various alerts, all as known generally in the art. For example only, such a diagnostic data manager may be pre-configured such that certain non-continuous monitoring diagnostics (e.g., such as the IAT or ECT rationality diagnostic) require that such diagnostic fail twice before a diagnostic trouble code (DTC) is set and a malfunction indicator lamp (MIL) is illuminated. As shown in FIG. 1, the ECU may be configured to set a corresponding diagnostic trouble code (DTC) 46 and/or generate an operator alert 48, such an illumination of a MIL. Although not shown, in one embodiment, the ECU 14 is configured so as to allow interrogation (e.g., by a skilled technician) for retrieval of such set DTCs. Generally, the process of storing diagnostic trouble codes and subsequent interrogation and retrieval is well known to one skilled in the art.

The invention provides the capability to detect the presence (i.e., operation during the previous soak) of the engine block heater 16, and the ECU 14 may thus be configured to generate (or store) some type of indication, such as a block heater present condition flag 44 or the like. In one embodiment, the diagnostic system may be configured to suppress or inhibit execution (or reporting of the results of) one or more of the sensor rationality diagnostics when the flag 44 is asserted. In this regard, even if a rationality test is performed (in some embodiments), it may be the reporting of such diagnostic's failure that is suppressed or inhibited. Again, as described above, other uses may be made of the block heater present flag 44 (or like indication) other than for diagnostics.

FIG. 1 further shows that ECU 14 is configured to include block heater detection logic 50, an engine off (soak) timer 51 and a data table 52. The logic 50 comprises generally the functionality described herein to detect the presence (i.e., operation) of the block heater 16. As described elsewhere, preferably, the logic 50 is pre-programmed software code stored for execution by ECU 14. The engine off timer 51 is configured to keep track of the time the engine has been off, and is used to verify that the engine has had a sufficient soak time, as described below. The data table 52 may comprise any data structure, and need not be a data table per se, but rather may include any structure or mechanism for returning the threshold value (described below) based on an integrated engine speed parameter versus an elapsed time since engine start-up.

In general, the invention provides a new and improved system and method for the detection of a block heater. The invention accomplishes this function, in one embodiment, through integrating the engine speed (RPM) and a Δ ECT to detect a characteristic engine coolant temperature profile during the initial moments following engine start-up. The invention allows calibration flexibility (i.e., allows for flexibly defining the predetermined data in table 52) to accommodate various RPM/temperature profiles. The data in table 52 may be developed empirically. A plurality of Δ ECT values are used. The Δ ECTs as used herein are the respective differences between the start-up ECT, on the one hand, and the plurality of operating ECTs measured after engine start-up, on the other hand. An integration of the Δ ECTs is compared with a calibration threshold value taken from the table 52. The thresholds are defined as a function of X-axis and Y-axis indexing. The X-axis index is the total elapsed time the engine has been running since start-up. The Y-axis is the integral (i.e., accumulated) of the engine speed (RPM) from engine start-up. Generally speaking, within a predetermined detection timeframe from the initial engine start-up, when the integrated Δ ECT value exceeds the threshold selected from the data table 52, this indicates the presence (i.e., operation during soak) of the engine block heater 16. It is believed that the accumulated (integration) of the engine speed is indicative of the total number of revolutions and hence correlates to the amount of circulation of the engine coolant. The engine speed also has a correlation with the amount of heat produced by the engine to be delivered to the engine coolant.

Figure 2A:
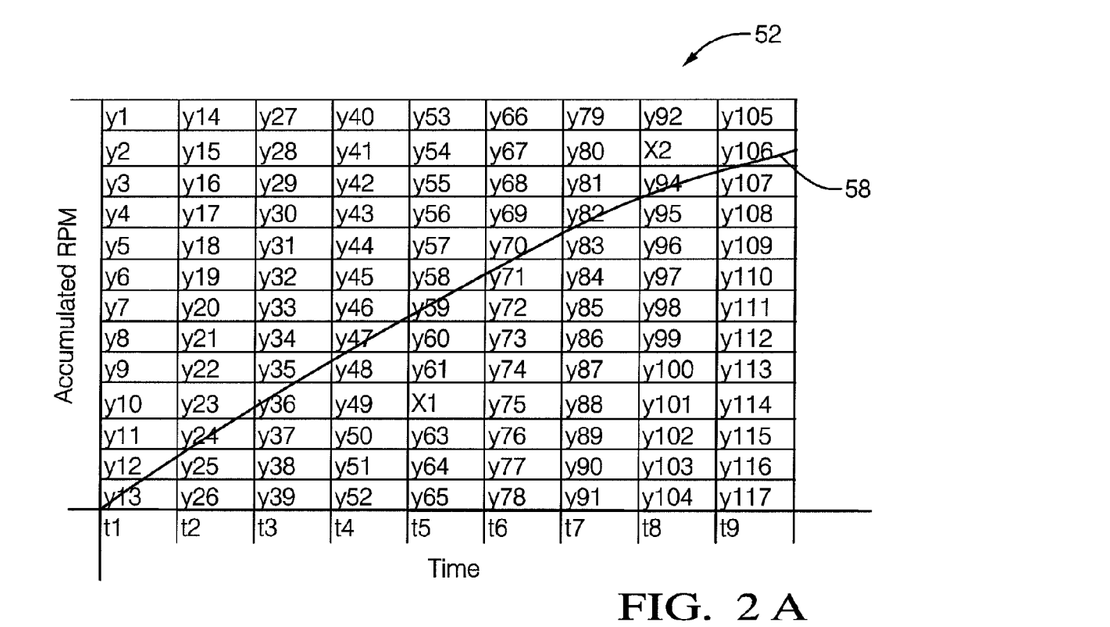
FIGS. 2A-2B are timing diagrams showing an calibration threshold and an integrated delta engine coolant temperature, respectively, plotted against the same timing axis.

FIG. 2A shows in greater detail one embodiment of the data table 52. The data table 52 is shown populated in exemplary fashion with a plurality of values y1, y2, y3, . . . , y117, which may be selected for use as a threshold during real-time execution of the method. As described above, the X-axis represents the time the engine has been running since engine start-up and the Y-axis represents the integrated (accumulated) engine speed (or revolutions per minute). FIG. 2A shows a trace 58 which represents one example trajectory of how engine revolutions may be accumulated as a function of time. Another example (not shown) where the engine speed is higher over this same time period will result in a steeper trajectory, while a still further example (not shown) where the engine speed is lower over this same time period will result in a shallower or a more flat trajectory.

Figure 2B:
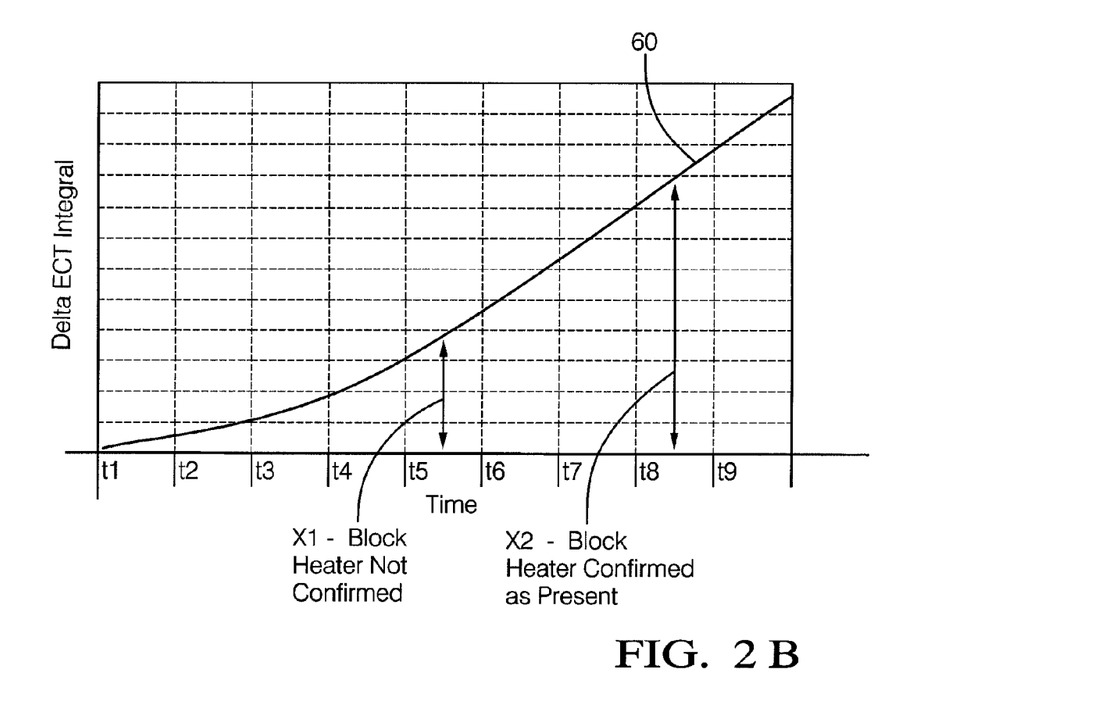

FIG. 2B shows the integral of Δ ECT over the same time period as FIG. 2A (i.e., the X-axis time scale for both FIGS. 2A-2B are the same and in registry with one another, so as to allow easier correspondence between the two). A trace 60 shows one example trajectory of the integrated Δ ECT.

An example will now be described, with reference to FIGS. 2A-2B, to illustrate the operation of an embodiment of the invention. First, the method is configured to determine whether various enabling conditions have been met (more detail below—see FIG. 3). One enabling condition to be verified is whether a minimum soak time (e.g., six hours) has been met. After a minimum soak time, the engine coolant temperature (ECT) of a liquid-cooled gas engine 12 equipped with a block heater 16 will exhibit a droop upon engine start-up, as described above.

Next, the method begins comparing the integrated Δ ECT with a threshold from the table 52 based on the integrated engine speed (Y-axis) versus elapsed time (X-axis) since engine start-up. Initially, the integrated Δ ECT and the integrated (accumulated) engine speed are set to respective initial values, typically zero, at the beginning of the detection period. The method may be configured to develop the integrated (accumulated) engine speed by measuring the engine speed (i.e., in RPM) at certain time intervals, and then adding each successively measured engine speed value to the previously accumulated sum. The trace 58 will vary as the engine speed (RPM) changes during the course of the detection procedure, and such changes will in turn vary the particular threshold that is selected from the data table 52. As the engine coolant contained outside the engine block begins to circulate into the warmed engine block, and mix with the warmed coolant in and adjacent to the block, a significant temperature drop will initially occur in the Δ ECT. The method is configured to calculate a plurality of such Δ ECT values over time. The calculation involves taking the difference between the start-up ECT (SUECT), on the one hand, and each one of the plurality of operating ECT values measured thereafter. The method is then further configured to integrate the plurality of Δ ECTs over time, which forms the trace 60 shown in FIG. 2B. In one embodiment, the method implements the integration by adding each successively calculated Δ ECT with the running (accumulated) total of Δ ECT values previously summed up to that point in time.

At predetermined times, the method compares the calculated Δ ECT integral value with the threshold drawn from the data table 52. Again, the threshold is selected based on the integrated engine speed (Y-axis) and elapsed time (X-axis). For example, between times t5 and t6, the calculated Δ ECT integral, having a value of X1, does not exceed the threshold drawn from the table 52, which has value between y58 and y59. For illustration purposes, the value of X1 is overlaid on the data table 52 so as to place its value in context relative to the threshold trace 58 (i.e., note that X1 is below the threshold trace 58). Therefore, this situation does not satisfy the condition needed to detect the operation of the block heater 16.

The method is configured to continue performing the comparing step at a predetermined evaluation rate until one of either a "block heater not detected" condition or a "block heater detected" condition is satisfied. There are two principal situations under which the block heater not detected condition may be satisfied: (1) where the operating ECT measured after engine start-up rises above and exceeds the start-up ECT (for a minimum time period for protection against signal noise); and (2) where a predetermined, maximum detection time period (e.g., 30 seconds) is reached for the key cycle. The block heater detected condition will be satisfied where the integrated Δ ECT value exceeds the threshold drawn from the data table 52. An example of this situation is illustrated in FIGS. 2A-2B between times t8 and t9, where the Δ ECT integral has a value of X2, which exceeds the threshold (trace 58), whose value at this time is approximately y94. For illustration purposes, the value of X2 is overlaid on the data table 52 so as to place its value in context relative to the threshold trace 58 (i.e., note that X2 is now above the threshold trace 58). When the block heater is detected, the control program in the ECU 14 may be configured to thereafter suppress or inhibit either the execution of, or alternatively, the reporting of results from, a sensor rationality diagnostic.

With continued reference to FIGS. 2A-2B, although a nine breakpoint (column) data table 52 is illustrated, other variations are possible. For example, a four or five breakpoint (column) data table 52 may provide adequate resolution to implement the invention. In addition, in a constructed embodiment, the method was configured to update the Δ ECT integral, the engine speed integral and perform the Δ ECT integral/threshold comparison, approximately eight times per second (i.e., every 125 milliseconds). It should be understood, however, that variations are possible. For example, a one (1) second loop where the integration operations and the comparison are performed may be sufficient to detect the presence of the block heater. Moreover, still further variations are possible. For example, the Δ ECT integration can be performed at a rate different from the engine speed integration, and the rate for the Δ ECT integral/threshold comparison can be done at a still different rate.

Figure 3:
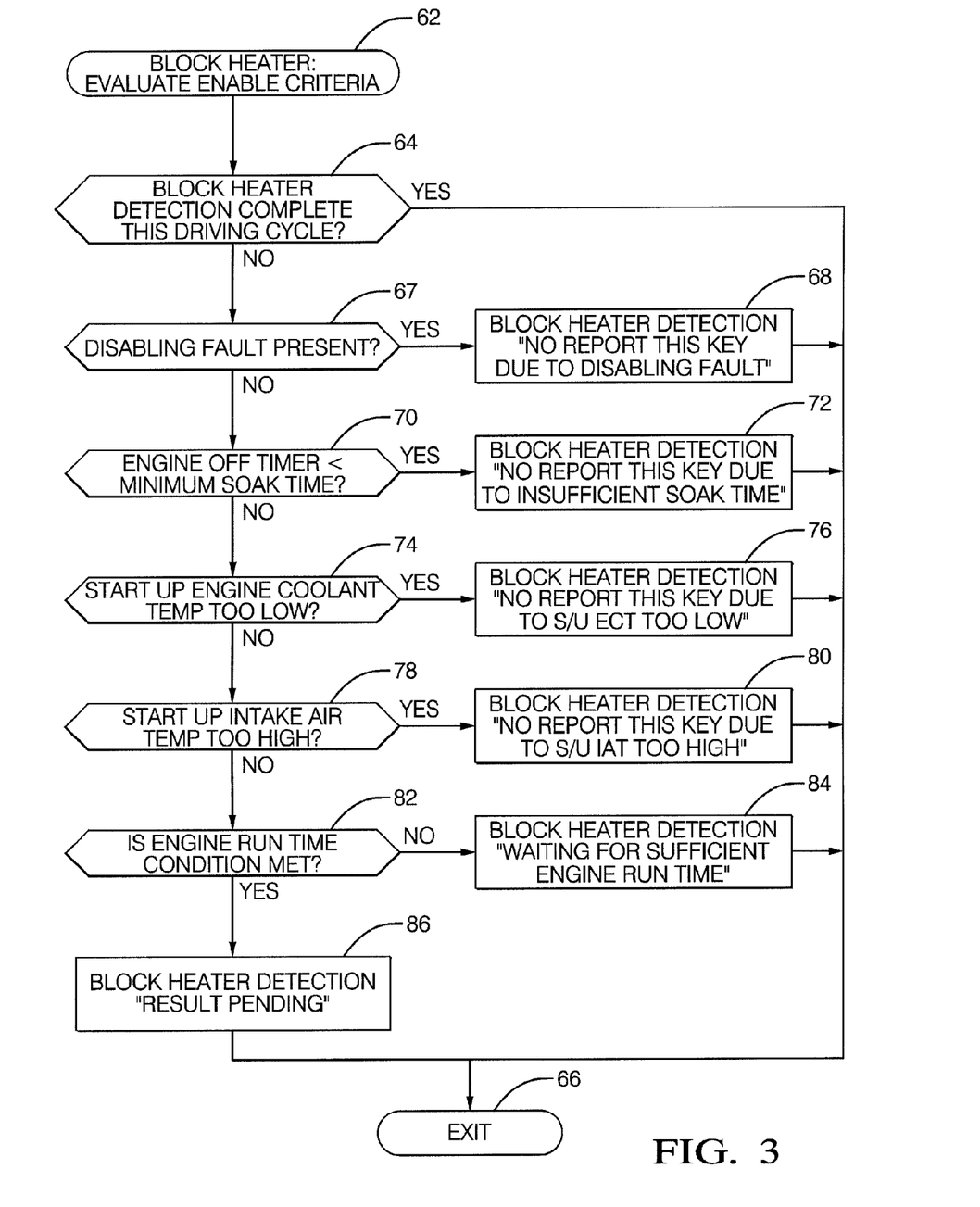
FIG. 3 is a flowchart showing a method for verifying that enabling criteria have been met as a condition precedent to performing the method of detecting an engine block heater.

FIG. 3 is a flowchart showing, in greater detail, the processing involved to verify various enabling conditions as a predicate for performing the block heater detection. Step 62 marks the start of this verification process, and the method then proceeds to step 64.

In step 64, the method determines whether the block heater detection method has already been performed for the present driving cycle. The check in this step latches, in effect, the result of the detection for any given driving cycle. Thus, if the answer is "YES", then the method branches to step 66 ("EXIT"). Otherwise, if the answer is "NO", then the method proceeds to step 67.

In step 67, the method determines whether any disabling faults are present. The block heater detection method cannot be performed if, for example, there is a fault in the engine coolant temperature (ECT) sensor of the type that would affect the block heater detection, which would constitute a disabling fault. Thus, if the answer is "YES", then the method branches to step 68, where the method generates (and/or stores) a return message ("No Report This Key due to Disabling Fault") and then exits at step 66. Otherwise, if the answer is "NO", then the method proceeds to step 70.

In step 70, the method determines whether a minimum soak time condition has been satisfied, which may be accomplished by reference to a so-called "engine off" timer 51 (FIG. 1). To evaluate the ECT during start-up for potential block heater usage, the engine must be in a "cold start" condition, as verified by the engine soak time. In one embodiment, the minimum soak time may be about six (6) hours, although other variations may be possible. If the "engine off" timer is less than the minimum soak time ("YES"), then the method branches to step 72, where the method generates (and/or stores) a return message ("No Report This Key due to Insufficient Soak Time") and then exits at step 66. Otherwise, if the answer is "NO", then the method proceeds to step 74.

In step 74, the method determines whether the start-up ECT is sufficiently high to run the block heater detection check. For example, consider an ECT sensor that has a low temperature reading limit of −40° C. Further consider that the method will preferably require an observed temperature drop of at least −10° C. Therefore, under these circumstances, if the coolant temperature at start-up is too low, say lower than −30° C., then the ECT sensor will not have enough lower sensing capability to reflect a −10° C. or greater Δ ECT as required for the inventive block heater detection method. Thus, if the SUECT is less than a predetermined setting (e.g., −30° C.), then the method branches to step 76, where the method generates (and/or stores) a return message ("No Report This Key due to S/U ECT Too Low") and then exits at step 66. Otherwise, if the answer is "NO", then the method proceeds to step 78.

Optional Step. In step 78, the method optionally determines whether the intake air temperature (IAT) is too high (i.e., the ambient air temperature is too high for a block heater to be in use). That is, although not shown, in one embodiment, the check in step 78 is omitted completely. However, in a second embodiment, step 78 may be optionally included to perform an IAT check (as shown). If step 78 is present, the value or calibration used may be selected sufficiently high so as to effectively rule out the detection of an engine block heater (e.g., this threshold may be about −5° C.). In this instance, if the answer is "YES", then the method branches to step 80, where the method generates a return message ("No Report this Key due to S/U IAT Too High") and then exits at step 66. In a still further third embodiment of the IAT check, a second calibration threshold may be provided (e.g., −5° C.), which is contemplated to be lower than the first calibration threshold mentioned above. It is contemplated that S/U IAT values between the lower) and upper (5° C.) calibration thresholds may preclude detection inasmuch as such SUIAT values may limit the ability to observe the expected ECT drop characteristic of block heater usage. In such a dual threshold IAT check embodiment, the method may be configured to report such circumstances (with or without actually running the detection logic). In any event, if the answer in step 78 is "NO", then the method proceeds to step 82.

In step 82, the method determines whether the engine has been running long enough to perform the detection method. This check requires that the engine be in a running state for at least a minimum amount of time prior to evaluating the engine coolant temperature so as to prevent signal corruption due to engine start-up noise. For example, engine cranking may significantly alter the vehicle battery voltage, making sensor readings during this period unreliable. This period is required to assure that this significant noise has subsided before relying on the sensor readings. This delay is system dependent, but could be in the range of 0 to 5 seconds, and more preferably between about 1 and 5 seconds. If the predetermined minimum amount of time delay has not yet elapsed ("NO"), then the method branches to step 84, where the method generates a return message ("Waiting for Sufficient Engine Run Time") and then exits at step 66. Otherwise, if the answer is "YES", then the method proceeds to step 86.

In step 86, the method, having determined that the enabling criteria has been met to run the main block heater detection, generates (and/or stores) a return message ("Result Pending") and then exits at step 66.

Figure 4:
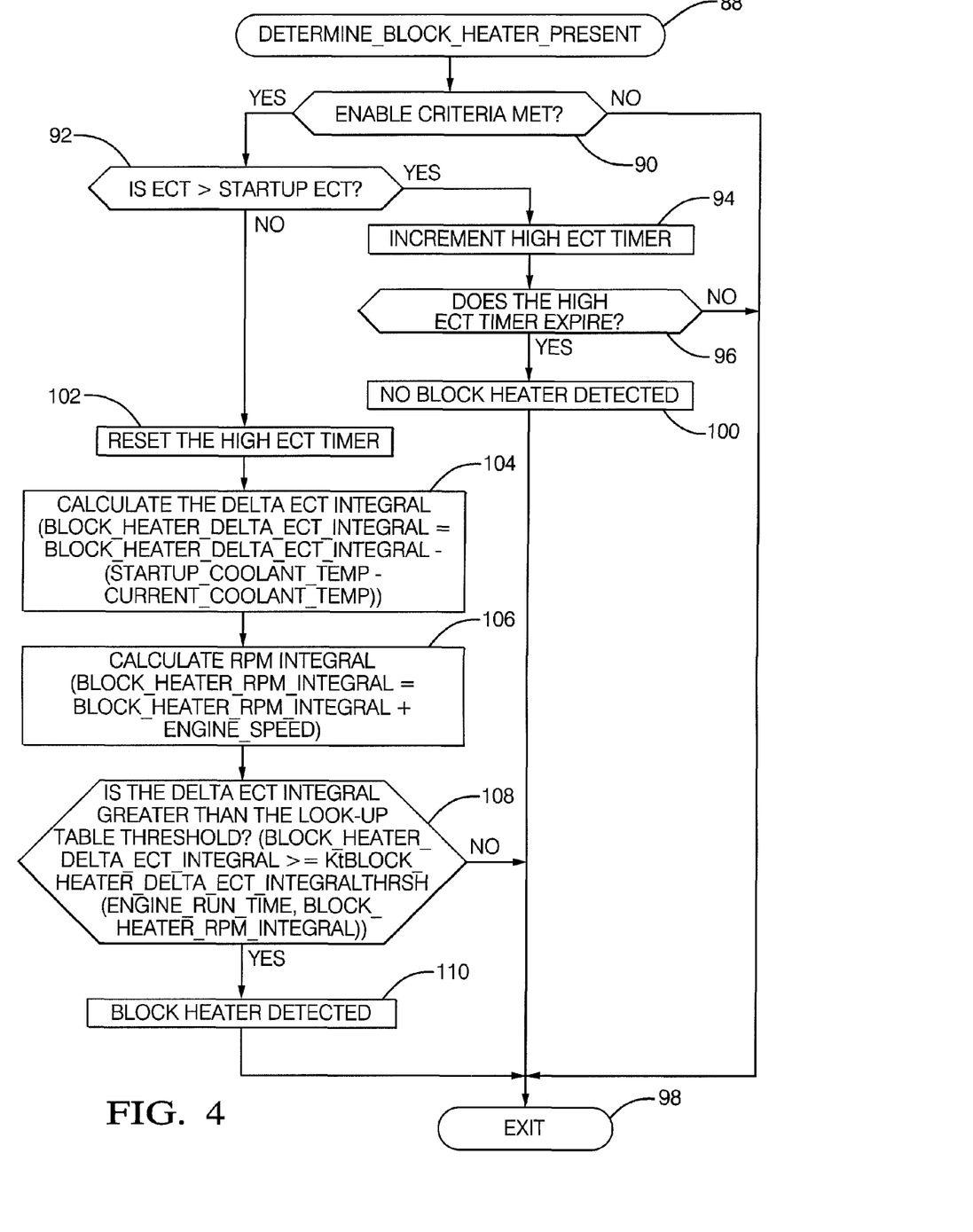
FIG. 4 is a flowchart showing a method of detecting an engine block heater according to the invention.

FIG. 4 is a flowchart showing, in greater detail, the processing involved to perform the actual block heater detection. Step 88 marks the start of the detection loop, and the method then proceeds to step 90.

In step 90, the method checks to determine whether all the enabling criteria have been met (FIG. 3). If the answer is "NO", then the method exits at step 98. Otherwise, if the answer is "YES", then the method branches to step 92.

In step 92, the method determines whether a post-start-up operating ECT (as measured) is greater than the start-up ECT (SUECT). For each loop (i.e., test execution), the block heater detection method checks the current ECT and compares it with the start-up ECT. If the current ECT is greater than the start-up ECT ("YES"), then the method branches to steps 94, 96 and 100. Steps 94, 96 and 100 collectively perform a noise filtering ("debounce") function to make sure that the conclusion that current ECT has exceeded the SUECT is reliable. In step 94, the method increments a High ECT Timer (e.g., a timer established internal to ECU 14). In step 96, the method determines whether the High ECT Timer has expired (i.e., has exceeded a minimum, calibratable time period). If the answer is "NO", then the method exits at step 98. Otherwise, if the answer is "YES", then the method branches to step 100, where the method generates (and/or stores) a return message ("No Block Heater Detected"). In one embodiment, the minimum, calibratable time may be within a range of about 5-10 seconds. If the path defined by steps 94, 96 and 100 is taken for the minimum, calibratable time, without intervention, then, as indicated in step 100, a block heater is deemed not to have been operated during the previous soak period.

On the other hand, if the current ECT does not exceed the start-up ECT, then the answer in step 92 is "NO" and the method branches to step 102.

In step 102, the method resets the High ECT Timer described above. It should be understood that the minimum, calibratable time referred to in connection with steps 94, 96 and 100 refers to a contiguous time period, which is why traversing the alternate loop (steps 102-110) will cause the High ECT Timer to be reset. The method then proceeds to step 104.

In step 104, the method calculates the Δ ECT integral. The method determines the difference between the current ECT for the present loop and the SUECT, which is then summed with the previous Δ ECT integral value to form (and store) the new Δ ECT integral value. The method proceeds to step 106.

In step 106, the method determines the integral of the engine speed (accumulated engine speed) by summing the current engine speed determined for the present loop with the previous (integral) accumulated engine speed value to form (and store) the new (integral) accumulated engine speed. The method then proceeds to step 108.

In step 108, the method performs the comparison of the Δ ECT integral with the appropriate threshold selected from the data table 52. The new integrated engine speed value (Y-axis) along with the elapsed time (X-axis) form the X, Y coordinate used to retrieve the threshold value from the data table 52. If the Δ ECT integral value is less than or equal to the retrieved threshold ("NO"), then the method branches and exits at step 98. However, if the Δ ECT integral value is greater than the retrieved calibration threshold ("YES"), then the method proceeds to step 110, where the method generates (stores) a return message ("Block Heater Detected"). This means that the block heater is or was operated during the previous soak period. It should be understood that for X-axis and Y-axis values between the individual coordinates defined by the table 52, interpolation may be used to determine the calibration threshold.

The present invention provides an improved strategy for detecting the presence and operation of a block heater during a previous vehicle soak period. This information can be used to inhibit or suppress certain rationality diagnostics (or the reporting of results thereof), and thereby prevent false failures from being registered with the diagnostic data manager.

It should be understood that the ECU 14 as described above may include conventional processing apparatus known in the art, capable of executing pre-programmed instructions stored in an associated memory, all performing in accordance with the functionality described herein. That is, it is contemplated that the processes described herein will be programmed in a preferred embodiment, with the resulting software code being stored in the associated memory. Implementation of the invention, in software, in view of the foregoing enabling description, would require no more than routine application of programming skills by one of ordinary skill in the art. Such an ECU may further be of the type having both ROM, RAM, a combination of non-volatile and volatile (modifiable) memory so that the software can be stored and yet allow storage and processing of dynamically produced data and/or signals.

While particular embodiments of the invention have been shown and described, numerous variations and alternate embodiments will occur to those skilled in the art. Accordingly, it is intended that the invention be limited only in terms of the appended claims.

The invention claimed is:

1. A method of detecting the operation of an engine block heater, comprising the steps of:

comparing an integrated delta engine coolant temperature (ECT) with a threshold until one of a heater detected condition and a heater undetected condition are satisfied;

determining a plurality of delta ECTs between a start-up ECT (SUECT) and a respective one of a plurality of operating ECTs; and integrating the plurality of delta ECTs over time to thereby define the integrated delta ECT.

2. The method of claim 1 wherein said integrating step is performed by the substeps of:

setting the accumulated delta ECT to a first initial value; and after said setting step, adding each delta ECT to the accumulated ECT as each successive delta ECT is determined.

3. A method of detecting the operation of an engine block heater, comprising the steps of:

comparing an integrated delta engine coolant temperature (ECT) with a threshold until one of a heater detected condition and a heater undetected condition are satisfied, wherein the threshold is selected based on at least an integrated engine speed and an elapsed time since engine start-up;

measuring the engine speed at a plurality of times to define a corresponding plurality of engine speeds;

setting the integrated engine speed to a second initial value;

after said setting step, adding each measured engine speed to the integrated engine speed as each successive engine speed is measured.

4. A method of detecting the operation of an engine block heater, comprising the step of:

comparing an integrated delta engine coolant temperature (ECT) with a threshold until one of a heater detected condition and a heater undetected condition are satisfied, wherein the threshold is selected based on at least an integrated engine speed and an elapsed time since engine start-up;

establishing a predetermined, maximum detection time period;

establishing an evaluation rate whose period is less than the maximum detection time period; and wherein said comparing step is performed at the evaluation rate using then-prevailing values of the integrated delta ECT and the threshold that is selected based on (1) the then-elapsed amount of time since engine start-up, and (2) the then-prevailing value of the integrated engine speed.

5. A method of conducting a rationality test in a vehicle with an engine having an engine block heater, comprising the steps of:

determining that predetermined enabling conditions have been met including that soak conditions meet predetermined criteria where a duration of a soak period exceeds a minimum;

comparing an integrated delta engine coolant temperature (ECT) with a threshold until one of a heater detected condition and a heater undetected condition are satisfied, wherein the threshold is selected based on at least an integrated engine speed and an elapsed time since engine start-up; and suppressing the rationality test when the block heater detected condition is satisfied indicative of an engine block heater being operated during the soak period.

6. The method of claim 5 wherein the rationality test includes at least one of an intake air temperature (IAT) skewed low diagnostic test and an ECT range low limited diagnostic test.

* * * * *